United States Patent [19]

Hirobe et al.

[11] Patent Number: 4,465,352

[45] Date of Patent: Aug. 14, 1984

[54] AUTOMATIC FOCUSING DEVICE

[75] Inventors: Hitoshi Hirobe; Shigeo Enomoto; Tadashi Minakuchi; Shinji Urata, all of Tokyo, Japan

[73] Assignee: Asahi Kogaku Kogyo Kabushiki Kaisha, Tokyo, Japan

[21] Appl. No.: 418,983

[22] Filed: Sep. 16, 1982

[30] Foreign Application Priority Data

Nov. 12, 1981 [JP] Japan ............................ 56-180368

[51] Int. Cl.³ .................... G03D 3/00; G03B 13/18
[52] U.S. Cl. ............................................ 354/406
[58] Field of Search ........................ 354/25, 31, 406

[56] References Cited

U.S. PATENT DOCUMENTS 4,382,665  5/1983  Eguchi et al. ..................... 354/25

4,392,726  7/1983  Kimura ............................ 354/25

*Primary Examiner*—Russell E. Adams
*Attorney, Agent, or Firm*—Browdy and Neimark

[57] ABSTRACT

An automatic focusing device for moving a photographic lens to an optimum focusing position by detecting an object image contrast signal that changes with the varying position of the photographic lens. The device stops the photographic lens while it is being moved between an infinite distance photographing position to a least distance photographing position when the level of the detected contrast signal becomes less than a threshold level. The invention compares a first signal, which is set to correspond to a position at which the photographic lens is to be stopped, and a second signal, which is generated when the contrast signal level is less than the preset threshold level.

10 Claims, 4 Drawing Figures

AUTOMATIC FOCUSING DEVICE

FIELD OF THE INVENTION

The present invention relates to improvements in an automatic focusing device which can adjust a photographic lens to an optimum focus by means of detecting the contrast of an image light beam passing through the photographic lens.

BACKGROUND OF THE INVENTION

Japanese Patent Laid-open No. 94334/1981 to the present applicant discloses a basic automatic focusing device of the same general type as the present invention. The focusing device of this patent teaches the use of an electric signal which changes with respect to the varying position of a photographic lens passing light from an object. If the electric signal contains information about the direction in which the photographic lens is to be changed, then the photographic lens is moved in that direction to an optimum focus. If not signal containing information about the direction of movement is obtained with a change in the position of the photographic lens, a lens driving motor is rotated at a high speed. In this case, the photographic lens is thus moved between an infinite distance photographing position and a least distance photographing position until a signal containing information about the direction of movement is obtained.

One disadvantage of this known focusing arrangement, however, arises in the case when a signal containing information about the direction of movement is not obtained with a change in position of the photographic lens, i.e., in the case when the contrast of the object image is very low or in the case of an object image having no contrast such as a white object.

In such a case, the photographic lens is in an insensitive region, in which the detection of contrast is impossible. Therefore, no electric signal which changes with a changing position as mentioned above, can be obtained even if the photographic lens is reciprocated between the infinite and least distance photographic positions any number of times. During this time, the lens driving motor is rotated at a high speed, thus causing excessive loads on the motor and the drive mechanism therefor. Further, when this focusing device is used in conjunction with a television camera, even a low contrast object image light beam passes through the photographic lens so that the image itself is reproduced on the picture tube. The viewer thus inevitably watches unpleasant out-of-focus images according to the movement of the photographic lens.

SUMMARY OF THE INVENTION

Accordingly, it is an object of the present invention to eliminate these problems of the prior art.

It is a further object of the present invention to provide an improved automatic focusing device, which comprises a lens stopping mechanism for preventing a photographic lens driving mechanism from bearing an excessive load and a resetting mechanism for releasing the lens stopping mechanism.

It is still another object of the present invention to provide an automatic focusing device of such an arrangement which eliminates problems caused when the contrast of an object image is very low or in the case when an object image has no contrast such as a white object.

These and other objects of the invention will be better understood if reference is made to the following description of typical embodiments of the present invention as illustrated in the accompanying drawings.

BRIEF DESCRIPTION OF THE DRAWINGS

In the accompanying drawings in which the same reference numerals and letters designate the same parts in all views.

DESCRIPTION OF PREFERRED EMBODIMENTS

Figure 1:
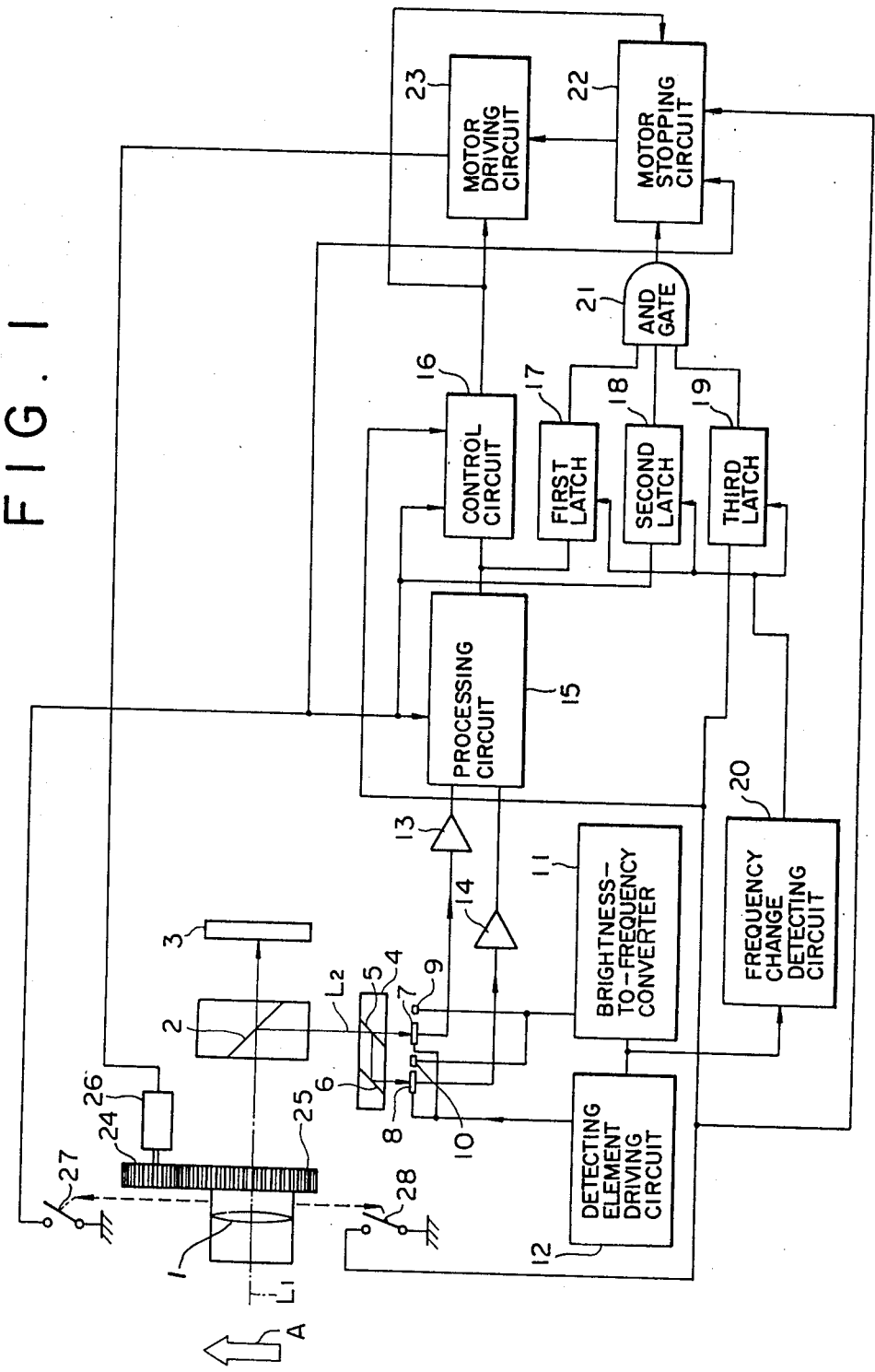
FIG. 1 is a schematic representational view of an embodiment of a first and second aspect according to the invention.

Referring now more particularly to the drawings, one of the preferred embodiments of the automatic focusing device according to the present invention may be seen in FIG. 1, where an object A faces a photographic lens 1 and a half reflecting mirror 2 is disposed behind the photographic lens 1 (on the right side in the Figure). The half reflecting mirror 2 is inclined at substantially 45 degrees with respect to a first optical axis L1. An image sensor 3, such as an image pick-up tube, is disposed behind the half reflecting mirror 2. A light splitter 4 includes a half reflecting mirror 5 and a reflecting mirror 6, which are spaced apart a predetermined distance from the half reflecting mirror 5 and is disposed on a second optical path L2 perpendicular to the first optical path L1, such that it faces the half reflecting mirror 2.

A front side detecting element 7 and a back side detecting element 8 are provided to face the half reflecting mirror 5 and reflecting mirror 6 of the light splitter 4, respectively. These detecting elements 7 and 8 serve to detect the contrast of the image of the object A. Photoelectric converters 9 and 10 are in communication with the respective detecting elements 7 and 8 and photoelectric detecting elements 9 and 10 are connected to a brightness-to-frequency converter 11, which produces a signal at a frequency corresponding to the brightness of the object A. Brightness-to-frequency converter 11 is joined to a detecting element driving circuit 12 and is connected to the front and rear side detecting elements 7 and 8 which are in communication with a processing circuit 15 through respective amplifiers 13 and 14. Outputs from the processing circuit 15 are supplied to a control circuit 16 and to a first latch circuit 17. The output of the first latch is supplied to a corresponding input terminal of an AND gate 21.

The output of the brightness-to-frequency converter 11 is also supplied to a frequency change detecting circuit 20 which supplies its output to first, second and third latch circuits 17, 18, 19. The outputs of the second and third latch circuits 18 and 19 are furnished to corresponding input terminals of the AND gate 21 which is in communication with a motor stopping circuit 22. Control circuit 16 mentioned above, is also connected to the motor stopping circuit 22. The output that is obtained through the control circuit 16 and motor stopping circuit 22, is supplied to a motor driving circuit 23, which drives a focusing motor 26.

Focusing motor 26 is coupled to a motor gear 24, which is in mesh with a focus ring gear 25 for driving the photographic lens 1 and can be brought into contact with limit switches 27 and 28 which are respectively located at the infinity distance photographing position and at a least distance photographing position. Limit switch 27 is connected to the motor stopping circuit 22, processing circuit 15, control circuit 16 and second latch circuit 18. The other limit switch 28 is connected to motor stopping circuit 22, control circuit 16 and third latch circuit 19.

Figure 2:
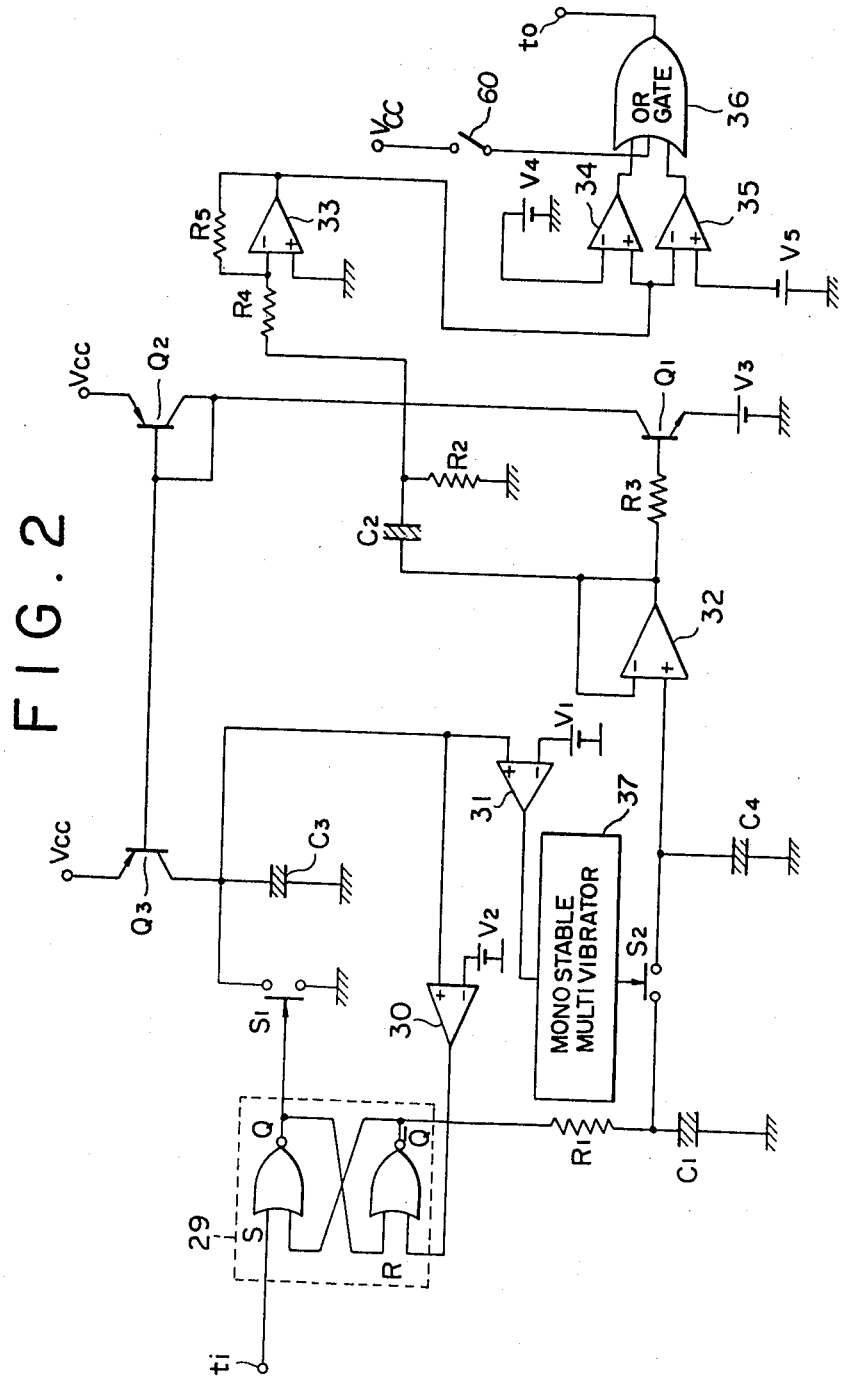
FIG. 2, is a circuit diagram showing a specific example of a frequency change detecting circuit in the embodiment of FIG. 1.

FIG. 2 shows an example of the frequency change detecting circuit 20. The output terminal of the brightness-to-frequency converter 11 is connected to an input terminal ti, which is connected to the S terminal of an RS flip-flop 29. The R terminal of the flip-flop is connected to the output terminal of a comparator 30 and the Q terminal of the RS flip-flop 29 is joined to a contact piece of a switch S1. The $\bar{Q}$ terminal of the RS flip-flop is connected to a series circuit consisting of a resistor R1 and capacitor C1 wherein the capacitor C1 includes a grounded end. Switch S1 has a grounded end, and its other end is connected to the collector of a transistor Q3. The collector of transistor Q3 is grounded through a capacitor C3 and is further connected to a non-inverted input terminal of the comparator 30. An inverted input terminal of the comparator is grounded via a reference voltage source V2. The collector of the transistor Q3 is further joined to a noninverted input terminal of comparator 31, which has its inverted input terminal connected through a reference voltage source V1 to ground. The output terminal of the comparator 31 is connected to the contact piece of a switch S2 via a mono-stable multivibrator 37, which can provide pulses having a narrow pulse width. One terminal of the switch S2 is joined to the juncture between the resistor R1 and capacitor C1.

The base of the transistor Q3 is attached to the base of a transistor Q2, and the collector of the transistor Q2 is connected to the collector of a transistor Q1. The emitter of each of the transistors Q2 and Q3 is connected to a voltage source Vcc. The base of the transistor Q2 is short-circuited to the collector thereof. Transistor Q1 has its emitter grounded via a reference voltage source V3 and its base joined to the output terminal of a buffer amplifier 32 through a resistor R3. Buffer amplifier 32 has its non-inverted input terminal connected to its output terminal and has its inverted input terminal grounded through a capacitor C4 and is also connected to the other terminal of the switch S2.

The output terminal of the buffer amplifier 32 connects to one terminal of the capacitor C2, and the other terminal of which is connected to the junction between resistors R2 and R4. The resistor R2 has a grounded terminal, and the resistor R4 has a terminal in communication with an inverted input terminal of inverting amplifier 33 which is also connected to its output terminal through a resistor R5 and also has its non-inverted input terminal grounded. The output terminal of the inverting amplifier 33 is also joined to a non-inverted input terminal of comparator 34 and also to an inverted input terminal of comparator 35. The non-inverted input terminal of the comparator 34 is connected to a reference voltage source V4, and a non-inverted input terminal of the comparator 35 is connected to a reference voltage source V5. Reference voltage source V5 has the opposite polarity to that of the other reference voltage sources V1, V2, V3 and V4. The voltage of the reference voltage source V2 is set to be higher than the voltage of the reference voltage source V1. The output terminals of the comparators 34 and 35 and a manual reset switch 60 are connected to respective input terminals of an OR gate 36. The output terminal of the OR gate 36 is joined to an output terminal $t_o$, which is connected to the latch circuits 17, 18 and 19.

Figure 3:
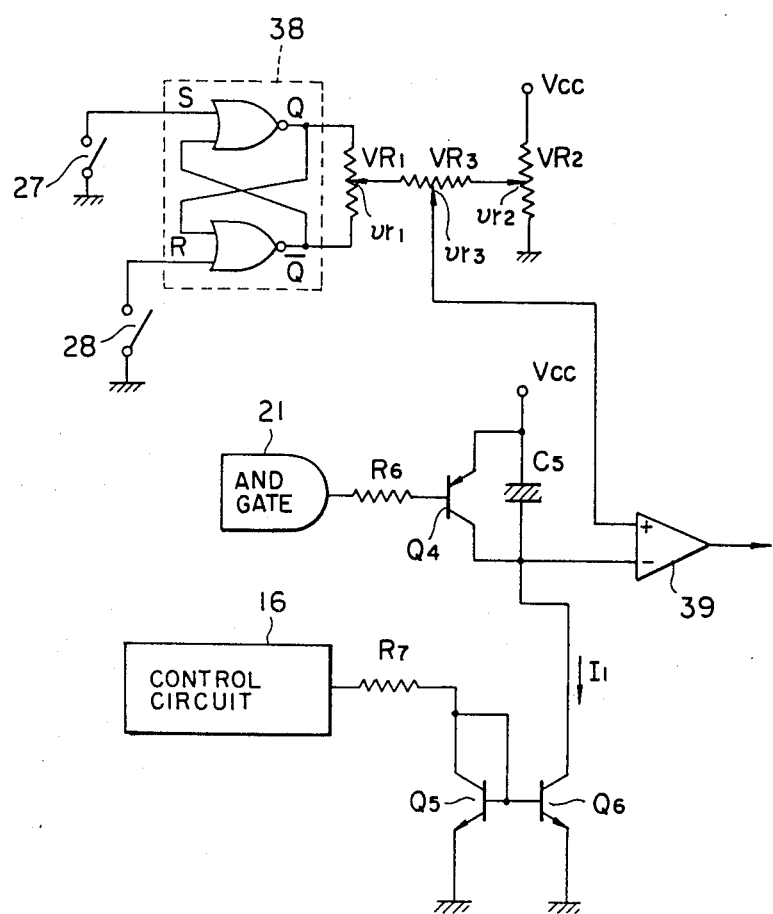
FIG. 3 is a circuit diagram showing a specific example of a motor stopping circuit in the embodiment of FIG. 1.

An example of the motor stopping circuit 22 can best be seen in FIG. 3. Here, the limit switch 27 is attached to the S terminal of RS flip-flop 38. The other limit switch 28 is connected to the R terminal of the flip-flop 38. A potentiometer VR1 is connected between the Q and $\bar{Q}$ terminals of the flip-flop 38 and has the slide terminal of the potentiometer connected to one terminal of another potentiometer VR3, which is in communication with a slide terminal of further potentiometer VR2. The potentiometer VR2 has one terminal connected to the voltage source Vcc and the other terminal grounded.

The output terminal of the AND gate 21 is mentioned above, is connected to the base of a transistor Q4 through a resistor R6. A capacitor C5 is connected between the emitter and collector of the transistor Q4. The emitter of the transistor is connected to the voltage source Vcc. Control circuit 16 mentioned above, is joined to the collector of a transistor Q5 through a resistor R7, which has its collector and base short-circuited to each other and has its emitter grounded. The base of the transistor Q5 is connected to the base of a transistor Q6. The transistor Q6 has its collector connected to the collector of the transistor Q4 and has its emitter grounded. The slide terminal of the potentiometer VR3 is connected to a noninverted input terminal of comparator 39, which has its inverted input terminal joined to the collector of the transistor Q4.

METHOD OF OPERATION

Figure 4:
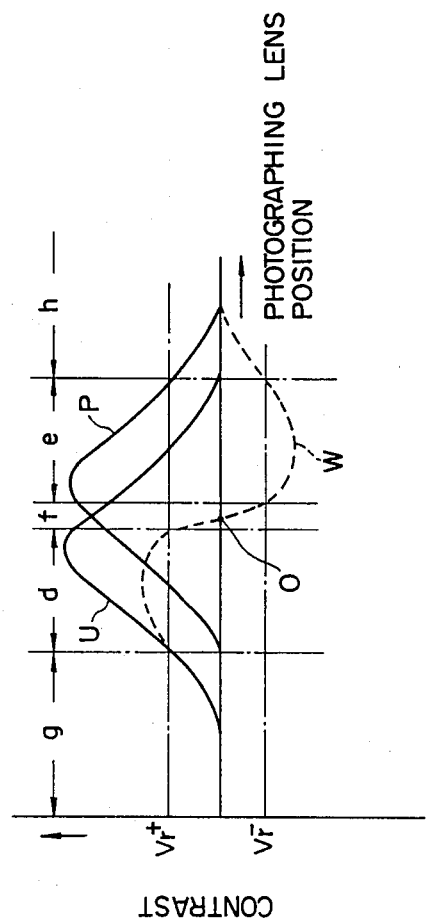
FIG. 4 is a graph illustrating the contrast signal level plotted against the photographic lens position.

As light from the object A passes through the photographic lens 1 to be focused on the front and rear side detecting elements 7 and 8, the outputs from the detecting elements are amplified by the respective amplifiers 13 and 14 to be supplied to the processing circuit 15. The processing circuit 15 provides a contrast signal, for instance, according to contrast curves P and U as shown in FIG. 4. These contrast curves represent the contrast plotted against the displacement of the photographic lens 1. The contrast curve P is for the output of the detecting element 7 while the contrast curve U is for the output of the detecting element 8. As shown in this graph, a curve W represents the difference between the contrast values in the curves P and U. $V_r^+$ and $V_r^-$ represent preset threshold values. Designated at g, d, e, f and h are regions defined by the intersections of the curve W with the lines of the threshold values $V_r^+$ and $V_r^-$. Designated at O is the focusing point. The regions d, e and f are sensitive regions, in which information about the direction of movement of the photographic lens 1 can be obtained. The regions g and h are insensitive regions, in which no such information can be obtained. The region f is the optimum focus region of the photographic lens 1.

Control circuit 16 operates the motor driving circuit 23 for driving the motor 26 in response to the output of the processing circuit 15. When the motor 26 is driven, the focusing gear 25 is rotated via the motor gear 24, thus causing movement of the photographic lens 1.

In the difficult case when the contrast of of the object A is zero or nearly zero, both contrast curves are entirely in the insensitive region. Hence, the contrast signal obtained from the processing circuit 15 contains no information about direction of movement of the photographic lens 1. Thus, the photographic lens 1 is moved toward the infinity or least distance limit switch. When the photographic lens 1 is moved to the infinity distance position to turn on the limit switch 27 on this side, the second latch circuit 18 is rendered operative. When the photographic lens 1 is moved to the least distance position to turn on the limit switch 28 on this side, the third latch circuit 19 is rendered operative. At this time, the first latch circuit 17 has been rendered operative by the output of the processing circuit 15 (i.e., the contrast signal containing no information about the direction of movement). With all the latch circuits rendered operative, all the input terminals of the AND gate 21 are now at a high level. As a result, the motor stopping circuit 22 is rendered operative, thus rendering the motor driving circuit 23 inoperative. Consequently, the photographic lens 1 is stopped at a preset position. In other words, the photographic lens 1 has covered a distance, which is the sum of the distance from its initial position to the infinity distance position and the distance from the infinity distance position to the least distance position, and further repetitions of such movement are prevented.

The operation of the motor stopping circuit 22 will now be described in further detail with reference to FIG. 3. When the infinity distance side limit switch 27 or least distance side limit switch 28 is turned on, the output from the Q terminal of $\bar{Q}$ terminal is changed to a high level or to a low level. In this case, with respect to the potentiometer VR1, the high level side is on the voltage source side while the low level side is on the ground side. If the contrast signals obtained from the detecting elements 7 and 8 are in the insensitive region, the AND gate 21 provides a high level output so that the transistor Q4 is turned off. At this time, the control circuit 16 is providing a high level signal having a predetermined pulse width for holding the motor driving circuit 23 operative for that period of time. A mirror circuit which is formed by the transistors Q5 and Q6 operates for the period of the high level signal. Collector current 11 is thus caused in the transistor Q6 and by means of collector current C5, the capacitor C5 is charged. The potential on the inverted input terminal of the comparator 39 (i.e., a second signal) continues to fall while the high level signal is provided from the control circuit 16.

The potentiometers VR1 and VR2 are set such that the difference between the potentials vR1 and vR2 at their slide terminals is equal to a predetermined terminal voltage across the capacitor C5. That is, it is set equal to the terminal voltage across the capacitor C5, to which the capacitor is charged when the photographic lens 1 is moved between the infinity distance photographing position and the least distance photographing position. The slide terminal of the potentiometer VR3 is set to determine the potential on the non-inverted input terminal of the comparator 39 (i.e., a first signal). For this reason, when either one of the limit switches 27 and 28 is first turned on, the motor stopping circuit 22 is rendered operative. In other words, the potential vr3 changes with a corresponding change in the outputs at the Q and $\bar{Q}$ terminals of the RS flip-flop 38, and when the potential VR3 becomes equal to the terminal voltage across the capacitor C5, the comparator 39 provides an inverted output to render the motor driving circuit 13 inoperative.

The potential vr3 may be set to different values depending on the photographic conditions. It may be manually set to a desired value or further, it is possible to store the focus position of the photographic lens 1 before the operation of the motor stopping circuit 22 in a suitable memory and move the photographic lens 1 to that position.

In a case when different brightness signals are obtained from photoelectric converting elements 9 and 10 as a result of a change in the brightness of the object A after the motor stopping circuit 22 has been rendered operative the frequency of the brightness-to-frequency converter 11 is changed according to the outputs of the photoelectric converting elements 9 and 10, and with this change the frequency change detecting circuit 20 is actuated to reset to the latch-circuits 17 to 19. The operation of the frequency change detecting circuit 20 will now be described in further detail with reference to FIG. 2.

When the frequency of the converter 11 is changed to a lower frequency, for instance, the duty ratio of the output pulse from the $\bar{Q}$ terminal of the RS flip-flop 29 is reduced to reduce the output of an integrating circuit constituted by the resistor R1 and capacitor C1. At this time, since the charging current to the capacitor C3 is set to a value which is controlled by the previous frequency, the output of the comparator 31 is inverted so that the switch S2 is turned on by the output of the mono-stable multi-vibrator 37. More particularly, since the buffer amplifier 32 is providing an output obtained by sampling and holding its input, with a change in the output of the integrating circuit as mentioned earlier, the level of the output of the comparator 31 is changed to actuate a differentiating circuit which is formed by the capacitor C2 and resistor R2. The output of the differentiating circuit is amplified by the inverting amplifier 33 according to the ratio of the resistance of the resistor R5 to the resistance of the resistor R4. The output of the inverting amplifier 33 actuates the comparators 34 and 35, whereby a reset signal is obtained from the OR gate 36. When the reset signal is obtained, the motor driving circuit 23 is rendered operative, whereby the normal automatic focusing action can be obtained. The reset signal can be manually supplied as well using manual switch 60.

When the frequency of the brightness-to-frequency converter 11 is not changed, the Q terminal of the RS flip-flop 29 is set to the low level by the set input to the S terminal (i.e., the output of the converter 11). Thus, the output of the integrating circuit constituted by the resistor R1 and capacitor C1 is not changed and the output of the buffer amplifier 32, obtained by sampling and holding the input thereto, is also not changed. For this reason, the output of the differentiating circuit constituted by the capacitor C2 and resistor R2 is not changed so that no reset signal is obtained from the OR gate 36.

It may happen that a contrast signal exceeding the threshold value Vr+ is obtained while the photographic lens 1 is being moved between the infinity distance photographing position and the least distance photographing position. The operation that takes place in such a case will now be described. When the photographic lens 1 is in a photographing position such that a contrast signal in excess of the threshold value Vr+ is obtained, i.e., when it is in one of the regions d and e shown in FIG. 4, the processing circuit 15 provides a signal containing information about the direction of movement of the photographic lens 1 on the basis of the curve W. Thus, the proper direction of rotation of the motor 26 is determined by the motor driving circuit 23, and the photographic lens 1 is stopped when a contrast signal corresponding to the region f is obtained. Of course, the photographic lens 1 is not moved in the event a contrast signal corresponding to the region f is obtained from the onset. When the photographic lens 1 is at a photographing position in which the contrast signal level is less than the threshold value Vr+, the processing circuit 15 provides no signal containing any information about the direction of movement of the lens. Therefore, the photographic lens 1 is moved toward either the infinity or least distance side. At this time, the first latch 17 is rendered operative by the signal from the processing circuit 15 which does not contain any information about the direction of movement. If the direction of rotation of the motor 26 is proper, the photographic lens 1 passes through the region d or e so that it is stopped when it reaches the region f. If the direction of rotation is not proper, the photographic lens 1 turns once to either the infinity or least distance side limit switch 27 or 28. The control circuit 16 thus generates an output for reversing the rotation of the motor 26, and subsequently, the photographic lens 1 passes through the region d or e and is stopped when it reaches the region f. At this time, either the second or third latch circuit 18 or 19 is rendered operative when the associated limit switch 27 or 28 is turned on, but both the latch circuits 18 and 19 are never simultaneously rendered operative. Thus, the AND gate 21 provides no output, and the motor stopping circuit 22 is not rendered operative.

As has been described in the foregoing, with the automatic focusing device according to the present invention for moving a photographic lens to an optimum focused position by detecting an object image contrast signal that changes with varying positions of the photographic lens, a lens stopping mechanism is provided for stopping the photographic lens that is being moved from an infinity distance photographing position to a least distance photographing position or in the opposite direction when the level of the detected contrast signal becomes less than a threshold level. Thus, the photographic lens can be stopped at a predetermined position without causing any wasteful movement, even in the case when the contrast of the object image is zero or very low.

While the invention has been described in detail above, it is to be understood that this detailed description is by way of example only, and the protection granted is to be limited only within the spirit of the invention and the scope of the following claims.

What is claimed is:

1. An automatic focusing device for moving a photographic lens to an optimum focused position comprising means for optically detecting object image contrast and means for generating a contrast signal based on said optically detected object image contrast, said contrast changing with varying positions of the photographic lens comprising:
    lens motion stopping means for stopping said photographic lens after it has been moved from a starting position no more than once between its infinity distance photographing position and its least distance photographing position when the level of said contrast signal is less than a threshold level of said detected contrast signal, whereby the lens is not repeatedly cycled between its infinity and least distance positions where the object being photographed has little or no contrast.

2. An automatic focusing device according to claim 1, wherein said lens stopping means compares a first signal, which is set to correspond to a position at which said photographic lens is to be stopped, and a second signal, which is generated when said contrast signal level is less than said preset threshold level and has a changing signal level which changes with the movement of said photographic lens from said infinity distance photographing position to the said least distance photographing position or in the opposite direction, and provides an output that is obtained as a result of the comparison of the said first and second signals to a motor driving circuit for driving said photographic lens thereby stopping said photographic lens.

3. An automatic focusing device for moving a photographic lens to an optimum focused position comprising means for optically detecting object image contrast and means for generating a contrast signal based on said optically detected object image contrast, said contrast changing with varying positions of the photographic lens comprising:
    a lens stopping means for stopping said photographic lens from being moved further after said lens has been moved from a starting position no more than once between its infinity distance photographing position when the level of said contrast signal becomes less than a threshold level; and
    resetting means for rendering said lens stopping means inoperative to thereby permit further lens motion when a change in the object brightness is detected above said threshold level, whereby the lens is not repeatedly cycled between its infinity and least distance positions where the object being photographed has little or no contrast.

4. An automatic focusing device according to claim 3, wherein said lens stopping means includes a comparator for comparing a first signal, which is set to correspond to a position at which the photographic lens is to be stopped, and a second signal, which is generated when said contrast signal level is less than said preset threshold level, and has a changing signal level when the movement of the photographing lens from said infinity distance photographing position to said least distance photographing position or in the opposite direction, and providing an inverted output that is obtained as a result of the comparison of the first and second signals to a motor driving circuit for driving the photographic lens.

5. An automatic focusing device according to claim 4, in which said resetting means includes a differentiating circuit rendered operative when a change in the object brightness is detected, and a frequency change detecting circuit for inhibiting the generation of said second signal compared in said motor stopping means when the output of said differentiating circuit is received as a reset signal.

6. An automatic focusing device according to claim 3, and manual switch means for manually operating said resetting means.

7. A method of automatically focusing a lens, comprising the steps of providing means adapted to drive said lens between its infinity and least distance focus positions, detecting the contrast of the object being photographed, generating an object contrast signal at all lens positions, providing a signal proportional to a predetermined threshold level of object contrast, said threshold level corresponding to a clearly focused image, comparing said generated object contrast signal to said threshold contrast signal, driving said lens to obtain a contrast signal above said threshold level and then stopping driving said lens; or alternatively to said last steps of driving and stopping, driving said lens one time only between said least distance and said infinity distance focus positions and then stopping driving said lens even if said generated contrast signal is below said threshold level, whereby the lens is not repeatedly cycled between its infinity and least distance positions where the object being photographed has little or no contrast.

8. The method of claim 7, and resetting the lens driving means after stopping driving said lens.

9. The method of claim 8, wherein said resetting step is performed automatically.

10. The method of claim 8, wherein said resetting step is performed manually.

* * * * *